United States Patent [19]

Claus et al.

[11] Patent Number: 4,950,886
[45] Date of Patent: Aug. 21, 1990

[54] PARTIALLY REFLECTING OPTICAL FIBER SPLICE FOR TEMPERATURE AND STRAIN MEASUREMENT

[76] Inventors: Richard O. Claus, Rte. 3, Box 138, Christiansburg, Va. 24073; Kimberley D. Bennett, 1001 Montgomery St., Blacksburg, Va. 24060; Kent A. Murphy, 3364 Crittendon Ave., Roanoke, Va. 24012; Sanjay Sudeora, 4630 Lake Trail Dr., Apartment 2D, Lisle, Ill. 60532

[21] Appl. No.: 373,561

[22] Filed: Jun. 30, 1989

[51] Int. Cl.[5] .............................................. H01J 5/16
[52] U.S. Cl. ................................ 250/227.14; 374/161
[58] Field of Search ...................... 250/227.14, 227.15, 250/227.21, 231.10; 374/161; 73/705

[56] References Cited

U.S. PATENT DOCUMENTS 4,408,123  10/1983  Sichling et al. ................. 250/231.10

FOREIGN PATENT DOCUMENTS

3236435A1  5/1984  Fed. Rep. of Germany ........ 73/705

Primary Examiner—David C. Nelms
Assistant Examiner—Khaled Shami
Attorney, Agent, or Firm—Kenyon & Kenyon

[57] ABSTRACT

An optical fiber device for allowing local measurement of temperature or strain using pulse amplitude techniques. The apparatus includes a fiber splice having a high temperature epoxy or solder to secure the opposing fibers in spaced relationship within a metal tube. By applying heat or stress to the tube the load causes the air gap to open or close which in turn varies the amount of light transmitted. By utilizing apparatus to measure the change in the amplitude affected by changes in the air gap, one can measure ultimately the strain or temperature imposed on the device.

10 Claims, 1 Drawing Sheet $L = i \times L_i \ (l_1 = l_2 = \cdots = L_i)$

PARTIALLY REFLECTING OPTICAL FIBER SPLICE FOR TEMPERATURE AND STRAIN MEASUREMENT

BACKGROUND AND DISCUSSION OF THE INVENTION

Optical fibers are commonly used in sensors, typically to measure some form of energy. Changes in the energy can affect changes in the fiber disposition, location, and configuration that manifest themselves for example as microbends. Light being transmitted through the optical fiber experiences changes in amplitude or phase due to the effect of microbends or other changes in fiber length.

Strain sensors have been developed to sense localized strain, that is, the strain present at discrete locations along the optical fiber. This localized strain corresponds to the energy present at a particular location along the fiber. One such strain sensor is described in U.S. Pat. No. 4,459,477 to Asawa et al. (hereinafter the Asawa et al. patent), where optical pulses are transmitted into the fiber. Microbend transducers dispersed along the exterior of the optical fiber cause changes in the amplitude in the transmitted optical pulses. The change in amplitude experienced by the optical pulses corresponds to the energy present with respect to a microbend transducer in a localized portion of the fiber. However, significant problems with the use of microbend transducers and optical fibers are the large power losses, the transient effects and the complex apparatus required to measure strain.

Another patent that relies on discontinuities to measure strain is U.S. Pat. No. 4,653,916 to Henning et al. (hereinafter the Henning et al. patent). Henning et al. and Asawa et al. patents rely on discontinuities produced by external means such as transducers. This relatively complex, burdensome and obtrusive system requires extensive external apparatus to measure localized strain. Because the discontinuities are external, strain in various locations throughout the cross-section of the structure cannot be measured. In the invention disclosed herein, the system of optical fibers and splices can be located throughout the cross-section of a structure to yield an array of strain and temperature measurements.

A feature of the invention avoids the need to rely on microbends and rather uses measurement techniques that correspond to changes in a gap between the fibers in a particular splice. This change corresponds to a change in pulse amplitude which can be utilized to measure temperature or strain. A sensor of the invention is comprised of optical waveguides used with a unique splice configuration. Two fibers of a low coefficient of thermal expansions, such as sapphire, are held within a metal tube by high temperature epoxy. The ends of the fibers are exposed within the tubes in spaced relationship to form an air gap therebetween. The air gap opens or closes depending on the load imposed by changes in temperature or strain and the amount of light transmitted varies accordingly. In this manner various locations along a particular structure can be measured for temperature and strain.

The above has been a brief description of the deficiencies of the prior art and advantages of the invention. Other advantages will be apparent from the detailed description of the preferred embodiment which follows.

DESCRIPTION OF THE PREFERRED EMBODIMENTS

Figure 1:
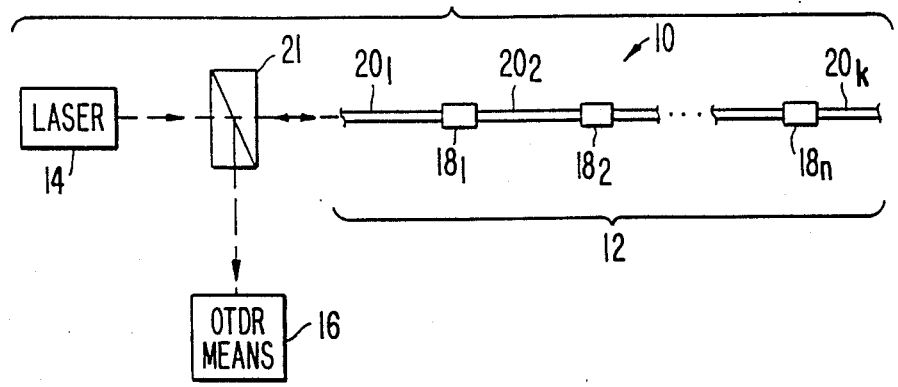
FIG. 1 is a schematic representation of a localized temperature or strain sensor.

Referring now to the drawings, wherein like reference numerals designate identical and corresponding parts throughout the several views, and more particularly to FIG. 1 thereof, there is shown a strain sensor 10 which includes optical waveguide 12. Strain sensor 10 is also comprised of means 14 for generating optical pulses to the optical waveguide 10. Preferably, the pulse generating means is a laser, but other types of optical pulse generators may be employed. Additionally, the strain sensor 10 is comprised of means for sensing localized strain in the optical waveguide 10. This system measures the time sequence and amplitude of optical pulses from various positions along the waveguide. Changes in the amplitude of a particular sequence are a function of temperature and ultimately strain at a particular location. By correlating the change in amplitude with length or other fiber dimensions, one can arrive at a strain or temperature measurement.

The sensing apparatus preferably includes means for reflecting a portion of the optical pulses at predetermined positions in optical waveguide 12 and detecting the shift in arrival times of the reflected optical pulses. Such a system is referred to herein as optical time domain reflectometry (OTDR) means 16.

The reflecting means includes a number n of optical splices 18 connected to the optical waveguide 12, wherein n is an integer and greater than or equal to 1. The optical waveguide 10 includes k optical fibers 20 connected in series by the n optical splices 18, where k is an integer greater than or equal to 1.

Figure 2:
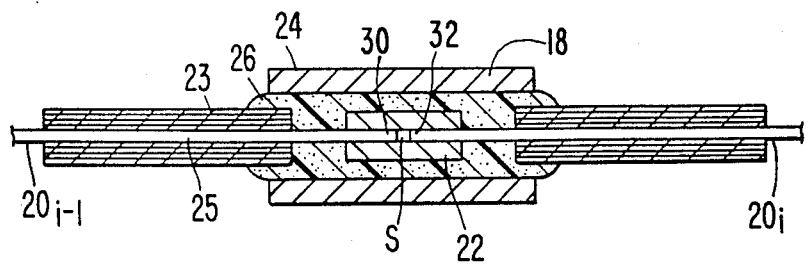
FIG. 2 is a schematic representation of a partially reflective optical fiber splice.
Figure 3:
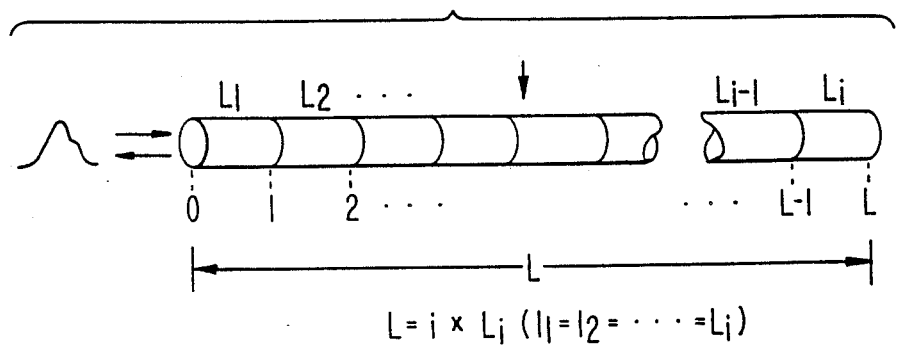
FIG. 3 is a schematic representation of an optical waveguide divided into discrete sections.

Each splice 18 includes an alignment sleeve 22, as shown in FIG. 2, for receiving two optical fibers 20 and aligning them such that a portion of an optical pulse passes therebetween and a portion of the optical pulse is reflected. As can be seen from FIG. 2, splice 18 permits two waveguides, in this case optical fibers, to be arranged in colinear relationship with their ends 30, 32 slightly spaced by gaps. This arrangement effects a reflection of a portion of an optical pulse while transmitting the remaining portion through the interface of the fibers.

Preferably, each optical fiber 20 has a portion of its optical fiber coating 23 removed so only the optical fiber core 25 of the optical fiber 20 is received by alignment sleeve 22. In this instance sleeve 22 is an encapsulating strain relief tube 24 which houses other elements of the splice. Epoxy 26 is applied to a portion of exterior surface 23 which couples the two optical fibers 18 into the encapsulating strain relief tube 24. In this embodiment the optical fiber device that permits local measurement of temperature or strain consists of an air gap in a fiber splice shown in FIG. 2. Two fibers are formed of a material of a relatively low coefficient of thermal expansion (CTE), such as sapphire, are held in spaced relationship within metal tube 24. The epoxy or metal solder is a high temperature material surrounding the fibers in such a way that unsupported central sections adjacent the fiber ends are free to move independently of the tube. In this manner, by applying heat or stress to the tube the applied load causes the air gap to open or close and the amount of light transmitted to vary accordingly. The light coupling loss between two fiber ends which are actually displaced is well known. A separation of approximately one core diameter produces approximately a 2dB optical power loss. The fiber and tube CTEs are chosen so that their difference is as large as possible and the minimum detectable temperature is as small as possible. By replacing the epoxy with an interference fit coupling of very low CTE, very high temperatures may be measured using this device.

Encapsulating strain relief tube 24 is impervious to most substantial external forces. Consequently, losses are minimized or eliminated. In this instance encapsulating tube 24 is a stainless steel tube; however, other dielectric material can be used as well. With this configuration essentially a constant percentage of each optical pulse is reflected as it passes through the encapsulating strain relief tube 24 regardless of the conditions external to the encapsulating strain relief tube 24.

In this preferred embodiment the splice is configured to have size which makes it amenable to be imbedded in most structures where it is needed to measure strain or temperature, particularly in those instances where a number of positions throughout the structure should be measured. As shown in FIG. 2, tube 24 is a right circular cylinder.

With this configuration a number of optical fibers can be joined by splices 18 in a colinear relationship to form a string 12. A number of strings 12 can be arranged in parallel planes and other positions throughout the structure. As a result the structure when subjected to a load, or temperature differentials, number of positions corresponding to the location of the splices are available for measuring the strain on the structure.

In the operation of the invention, an optical pulse from a laser is launched into optical fiber $20_1$. The optical pulse travels down the optical fiber $20_1$ until it reaches the first splice $18_1$. A certain percentage of the optical pulse is then reflected back toward the launching end of the optical fiber 20, while the unreflected portion of the pulse continues into optical fiber $20_2$.

The portion of the optical pulse reflected by the first splice $18_1$ emerges from the launching end of optical fiber $20_1$ and is directed by beam splitter 21 which in turn reflects a portion of the beam to OTDR means 16. For a more complete discussion of optical time domain reflectometery (OTDR), se U.S. Pat. No. 4,653,916 issued Mar. 31, 1987, naming Henning et al. as inventors which patent is incorporated therein by reference. The OTDR means 16 determines the difference in amplitude from that when the optical pulse travels from the laser to the first splice $18_1$, where a portion of it is reflected, and for the reflected portion to travel back to the OTDR means 16; as compared to the amplitude when an optical pulse travels the same path when there is a known strain present in the optical fiber $20_1$. This difference in amplitude corresponds to the localized strain relative to the known localized strain, and is essentially the result of the different gaps between a particular set of fibers. Preferably, the known strain is zero against which the unknown strain is compared.

The portion of the optical pulse that is not reflected by the first splice $18_1$ continues to optical fiber $20_2$ until it reaches the second splice $18_2$. At the second splice $18_2$ the optical pulse again has a portion reflected back towards the launching end of optical fiber $20_1$, and an unreflected portion that continues through the second splice $18_2$ into optical fiber $20_3$ which is downstream of splice $18_2$.

The reflected portion of the optical pulse from splice $18_2$ returns through splice $18_1$, and optical fiber $20_1$ to the beam splitter 21 where it is directed to be received by the OTDR means 16. The OTDR means 16, for example, subtracts the time $T_1$ it takes the optical pulse to travel to the OTDR means 16 via a portion of the optical pulse being reflected by the first splice $18_1$, from the time $T_2$ it takes the optical pulse to travel to the OTDR means 16 via a portion of the optical pulse being reflected by the second splice $18_2$. The difference in these times $(T_2 - T_1)$ is essentially the time it takes the optical pulse to travel from the first splice $18_1$ to the second splice $18_2$ and back to the first splice $18_1$. By subtracting the time $T_1$ from the time $T_2$ localized strain effects on the optical fiber $20_1$ are removed from consideration in the determination of localized strain with respect to optical fiber $20_2$. In other words, the determination of localized strain on optical fiber $20_2$ does not include the effects of localized strain on optical fiber $20_1$. The difference in time $(T_2 - T_1)$ is then compared to the time corresponding to an optical pulse traveling the same path but associated with a known localized strain with respect to optical fiber $20_2$. The difference in the time $T_2 - T_1$ and the known time corresponds to the localized strain with respect to optical fiber $20_2$ relative to a known strain with respect to optical fiber $20_2$. As mentioned above, preferably the known strain is zero, so the localized strain is the actual strain with respect to optical fiber $20_2$. The difference in the time $T_2 - T_1$ of the known time corresponds to the difference in length of optical fiber $20_2$ with respect to the localized strain relative to a known localized strain.

The above description of the operation concerning splices $18_1$ and $18_2$ and strain and optical fibers $20_1$ and $20_2$ is applicable for each splice 18 downstream from splice $18_2$ and each optical fiber 20 downstream from optical fiber $20_2$. In general, the time $T_{i-1}$ it takes an optical pulse to travel from the laser to a splice $18_{i-1}$ and from the splice $18_{i-1}$, upon reflection, to the OTDR means 16 is subtracted from the time $T_i$ it takes the optical pulse to travel from the laser to the optical splice $18_i$ and from the splice $18_i$, upon reflection, to the OTDR means 16. In each case the difference in time $T_i - T_{i-1}$ corresponds to the time it takes an optical pulse to travel from a splice $18_{i-1}$ to a splice $18_i$ and back to splice $18_{i-1}$ via optical fiber $20_i$. At each time interval the amplitude of a particular pulse is measured against a reference. Change in the amplitude of a particular pulse corresponds to strain or temperature at a corresponding location, specifically the location of the splice.

The above system is particularly amenable to measuring the strain of a structure at various points throughout the structure cross-section. Because of the size and efficiency of the elements employed the waveguides and splices can actually be embedded in the structure to be sensed. By using the OTDR method discussed above the strain at a number of locations can be obtained without unnecessarily weakening the structure. Where a multi-dimensional array of spliced fibers are employed a three dimensional analysis can be obtained.

Although the invention has been described in detail in the foregoing for the purpose of illustration, it is to be understood that such detail is solely for that purpose and that variation can be made therein by those other than the art without departing from the scope of the invention as described in the following claims.

What is claimed is:

1. A fiber optic apparatus for measuring temperature comprising:
   (a) a first fiber having a first end;
   (b) a second fiber having a second end;
   (c) a splice, said fibers being arranged within said splice along a common axis with said ends spaced from one another, said splice including a metal tube, holding material for holding a portion of said fibers within said tube along said common axis with a portion of each fiber adjacent the ends thereof exposed within said tube, said exposed portion being free to move independently of the tube;
   (d) said fiber and said holding material cooperating to permit axial displacement of at least the exposed portion of said fibers when subjected to varying temperatures.

2. The fiber optic apparatus according to claim 1 wherein each fiber has a low coefficient of thermal expansion relative to that of said tube.

3. The fiber optic apparatus according to claim 2 wherein said holding material is formed of a material having a relatively low coefficient of thermal expansion relative to that of said tube.

4. The fiber optic apparatus according to claim 3 wherein said tube is made of metal.

5. The fiber optic apparatus according to claim 4 wherein said holding material is a high temperature epoxy.

6. The fiber optic apparatus according to claim 4 wherein said holding material is metal.

7. The fiber optic apparatus according to claim 4 wherein said holding material is a ceramic material.

8. The fiber optic apparatus according to claim 4 wherein said holding material is glass.

9. The fiber optic apparatus according to claim 1 wherein said fibers consist of sapphire.

10. An apparatus for sensing temperature or strain including:
    (a) a first fiber having a first end;
    (b) a second fiber having a second end;
    (c) a splice, said fibers being arranged along a common axis within said splice with the ends spaced from one another, said splice including a tube;
    (d) a holding material for holding a portion of said fiber within said tube along said common axis with a portion of each fiber adjacent the ends thereof exposed within said tube, said exposed portion being free to move independently of the tube;
    (e) said fiber and said holding material cooperating to permit axial displacement of at least the exposed ends of said fibers when subjected to varying temperatures, means for emitting a light signal into said first fiber at an end remote from said first end;
    (f) means for sensing reflection from said first end; and
    (g) means for sensing the amplitude of said reflection and changes in said amplitude as a measure of changes in temperature.

* * * * *